July 3, 1934.  L. B. RITTENHOUSE  1,965,057
VALVE GEAR LOCK
Filed April 18, 1933
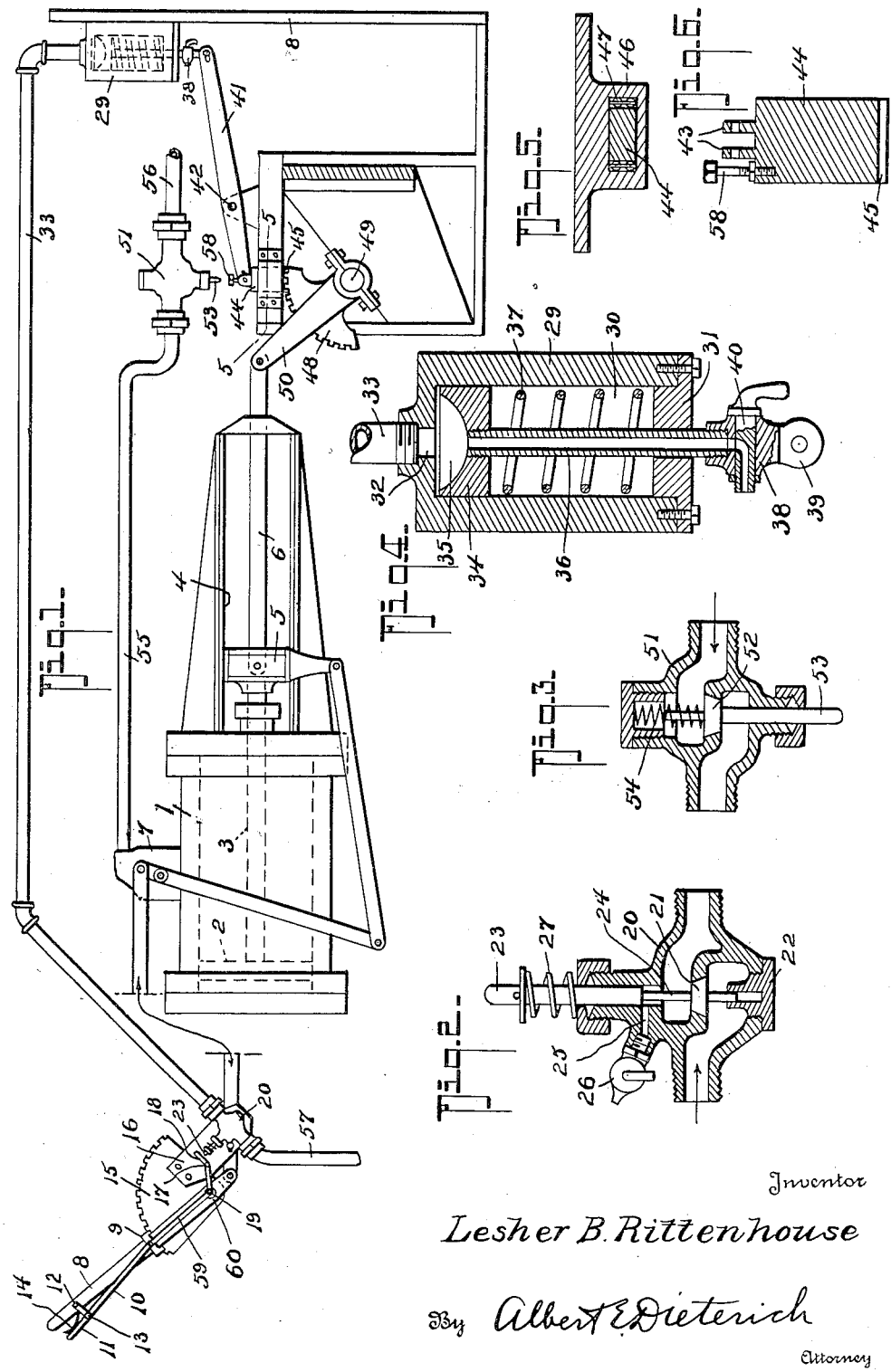
Inventor
Lesher B. Rittenhouse
By Albert E. Dieterich
Attorney Patented July 3, 1934

1,965,057

UNITED STATES PATENT OFFICE 1,965,057

VALVE GEAR LOCK

Lesher B. Rittenhouse, Baltimore, Md.

Application April 18, 1933, Serial No. 666,722

10 Claims. (Cl. 121—40)

My invention relates particularly to locomotive engines having power reverse gear. With power reverse gear it is not uncommon for the air or steam to the power reverse cylinder to leak through the steam valve so that the cylinder will establish pressures which cause the piston to creep.

My invention has for an object to provide means to lock the engine-power cylinder valve gear and the power reverse gear in any desired position.

Further, it is an object to provide means to prevent the power reverse gear from moving or creeping after it has been placed in the desired position.

Further, it is an object to provide means to take the strain off and eliminate the wear of the various bushings and packings connected with the power reverse gear.

Further, it is an object to provide means by the use of which fuel is saved and the locomotive may be operated at all times at its highest efficiency with proper cut-off of steam.

Further, it is an object to provide a device of the character stated that can be applied to any locomotive now equipped with power reverse gear without interfering with any other working parts (even if the reverse gear is badly worn and not performing well, it can be made to perform perfectly with the aid of my invention because the valve gear is locked directly, which holds the reverse gear in the same position, and the air or steam is cut out of reverse gear after it has been locked by the closing of the reverse cylinder valve so that air or steam does not enter reverse cylinder again until another movement is desired).

Further, it is an object to provide apparatus of such cooperative parts that in case of air pump failure or break-down on line of road, the locomotive should lose the air, the engineer can assist in hauling the train and operate the engine with the proper cut-off without damage to any parts by turning steam into reverse gear and permitting it to stay in (because it only goes as far as reverse cylinder valve and is only put in reverse gear cylinder when needed to reverse or change to another position).

Another object is to provide means whereby the engine cannot move the reverse gear until the rocker shaft, and consequently the reverse gear, shall have been unlocked and the power will not be passed to the reverse gear until after the rocker shaft shall have been unlocked.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is an elevation somewhat diagrammatically illustrating the cooperating parts of my invention.

Figure 2 is an enlarged detail longitudinal section of the control valve.

Figure 3 is an enlarged detail longitudinal section of the reverse cylinder cut-off valve.

Figure 4 is an enlarged detail longitudinal section of the lock cylinder.

Figure 5 is a detail horizontal section on the line 5—5 of Figure 1.

Figure 6 is a detail vertical cross section of the latch.

In the drawing in which like numerals of reference indicate like parts in all of the figures, 1 is the cylinder of the power reverse gear, 2 the piston thereof, 3 the piston rod, 4 the cross head guide, 5 the cross head, 6 the connecting rod between the cross head 5 and the rocker shaft operating lever 50.

7 is a usual valve chest in which is located the usual valve for admitting operating fluid (usually air) to one or the other end of the cylinder 1 accordingly as the valve is set in one position or another.

8 designates the engineer's governing lever which is fulcrumed at 60 and has a latch 9 to cooperate with a fixed quadrant 15 to hold the lever 8 in any of its set positions. The lever 8 is provided with a bell crank 11 pivoted at 12 and pressed out by a spring 14. The bell crank is connected with the latch 9 by a connecting rod 10 pivoted to the lever 11 at 13.

16 is a control valve supporting plate stationarily located and on which the control valve 20 is suitably mounted. The valve 20 has its stem 23 positioned to be operated by a control valve operating trigger lever 18 which is pivoted at 17 to the plate 16 and has one end pivotally connected at 19 to a rod 59 from the latch 9. The point of pivotal connection 19 is preferably located in alignment with the pivotal center 60 of the lever 8 so that the same amount of thrust may be given to the valve stem 23 by the lever 18 regardless of what position the lever 8 may be in.

As will more clearly appear by reference to Figure 2, the valve 20 is provided with a valve proper 21 which controls the flow of fluid from the duct 57 that leads from the main reservoir to the duct 33 that leads to the lock cylinder 29. The casing of the valve 20 is preferably provided with a removable plug 22 having a valve stem guide for the reduced portion 24 of the valve stem 23. There is also provided a bleeding port 25 leading to a control cock 26, by means of which cock the escape of fluid through the duct or port 25 may be varied as desired.

A light spring 27 is provided to assist in closing the valve 21, which valve is held closed principally by the pressure of fluid on the inlet side of the valve.

The lock cylinder 29 is mounted on a suitable support 28. It comprises a housing having a chamber 30 closed by a suitable cap 31, there being a piston 34 mounted in the chamber 30 and having a hollow piston rod 36 projecting through the cap 31. The piston 34 is cupped at 35 to gather products of condensation which flow down through the hollow rod 36 and may be drained by means of valve 40 in a cock 38 secured to the lower end of the rod 36 and having ears 39 to which the lever 41 is connected by a suitable pin and slot connection.

The cylinder 29 has a port 32 with which the duct or pipe 33 communicates.

Normally the cock 40 is closed, it being understood that it is opened only for draining purposes in case of condensation of fluid.

A strong spring 37 is provided in the cylinder 29 which continuously tends to force the piston 34 upwardly and consequently keep the latch 44 in engagement with the quadrant 48.

The lever 41 is fulcrumed at 42 and has its short arm connected with the lugs 43 of the latch 44 by a suitable pin and slot connection. The latch 44 is mounted in a suitable carrier 46 that is mounted on a portion of the support 28 and is preferably provided with anti-friction bearings 47. The latch 44 has teeth 45 to mesh with those of the quadrant 48.

The quadrant 48 may be integrally cast with the lever 50 or it may be separately secured to the shaft 49 welded or bolted to the lever 50 as a separate part, these being mere details of mechanical structure not effecting the substance of the invention, illustration of the various ways of securing the quadrant 48 to the rocker shaft 49 or lever 50 are thought to be unnecessary. In the preferred embodiment shown the quadrant 48 is an integral part of the lever 50.

The latch 44 is provided with a suitable stud 58 so located with respect to the stem 53 of the cutoff valve 51 that after the latch 44 has been raised enough to disengage the quadrant 48, further movement will cause the stud 58 to engage the stem 53 and open the valve proper 52, thus allowing motive fluid (usually air) to pass from the main reservoir pipe connection 56 through the duct 55 to the reversing cylinder valve chest 7 where it is passed under control of the valve in that chest to one or the other ends of the cylinder 1. The valve proper 52 is held seated by the fluid pressure on the inlet side assisted by the light spring 54. The cut-off valve 51 is located in the duct 55 between the main reservoir and the reverse valve chest.

The manner in which my invention operates is as follows:

The locking device is operated by the engineer just the same as any reversing gear now being used. As the engineer grasps the lever 8 he at the same time rocks lever 11 which releases latch 9 and opens valve 21, allowing fluid to pass from the main reservoir pipe 57 via pipe 33 to the lock cylinder 29 where it acts upon the piston 34 to force it downwardly. This movement of the piston 34 is transmitted to the long arm of the lever 41 with the result that the lever is rocked to cause a withdrawal of the latch 44 from the teeth of the quadrant 48 and cause the opening of the valve 52, thereby permitting motive fluid to flow from the main reservoir pipe 56 through the duct 55 to the valve chest 7. Movement of the lever 8 then causes the operation of the valve 7 to admit motive fluid to one or the other end of the cylinder as the case may be to move the piston 2 to its desired position. As soon as the engineer lets go of the lever 8, spring 14 rocks lever 11 to restore latch 9 into locking engagement with quadrant 15 and also to move trip lever 18 out of engagement with valve stem 23. Consequently valve 21 is closed and bleeding port 25 is open. After a determined interval of time, fluid pressure in duct 33 is bled to atmosphere and spring 37 gradually returns piston 100 to its upper position. In consequence thereof latch 44 is first released from stem 53 and then brought into latching engagement with quadrant 48. This cuts off the live fluid pressure from duct 56 to duct 55.

It is noted that with a valve of the construction shown in Figure 2 the stem 23 controls the port 25 so that as the valve 21 is opened the port 25 is closed and leakage of motive fluid to bleed cock 26 is prevented while that motive fluid is being used for power purposes on the piston 34.

The distance between the top of the stud 58 and the valve stem 53 is just enough to allow the teeth 45 in the latch to become disengaged from the teeth in the quadrant 48 before contact is made between the stud and valve stem. The teeth in the quadrant 48 and latch 44 are made strong enough to stand any hard pull such as when the locomotive cylinders may not be well lubricated.

It is noted that the construction of the parts shown in Figure 4 is such that no packing is required around the rod 36 which has a loose fit in the cap 31 so that there is a greater freedom of movement of the piston 34 than would be the case did the rod 36 have fluid-tight packing, and as the lever 41 is fulcrumed with its short arm connected to the latch and the long arm connected to the lugs 39 considerable power is given to hold the latch 44 in engagement with the teeth of the quadrant 48 and requires less power to release the latch from the teeth than would be the case were a direct connection depended upon between the parts 39 and 43.

The apparatus complies with the safety first rules of the railroads in every respect.

The teeth of the quadrant 48 may be protected by a suitable housing to keep out dirt when the locomotive is on the road and when in the shop.

When the reverse gear cylinder is to be arranged for operation by steam the pipes 56 and 57 will be connected to the steam supply in any desired way instead of to the main air reservoir.

It should, of course, be understood that changes in the details of construction and arrangement of rods, piping and other parts may be made to adapt the invention to particular locomotives, all such changes being mere mechanical installation details and may be made without departing from the scope of the invention.

From the foregoing, taken in connection with the accompanying drawing, it is thought the complete construction, operation and advantages of my invention will be clear to those skilled in the art to which it relates.

What I claim is:

1. In combination with a locomotive cylinder valve gear which includes a rocker shaft, and a power reverse gear connected to said rocker shaft, means to lock said rocker shaft in any of its "set" positions, said power reverse gear including a power reverse cylinder having a valve chest, a duct from a main reservoir to said valve chest, a cut-off valve in said duct and located adjacent said rocker shaft locking means and to be actuated thereby, and means under the control of the engineer for actuating said locking means alternately to lock said rocker shaft and to actuate said cut-off valve.

2. In an apparatus of the class described, a rocker shaft of a locomotive valve gear, a power reverse gear for actuating said rocker shaft, a main governing lever cooperatively associated with and forming a part of said power reverse gear, a quadrant carried by said rocker shaft, a latch cooperating with said quadrant, a lever to operate said latch, means for actuating said latch-operating lever, means cooperatively associated with said main governing lever for controlling the latch operating lever actuating means, a duct for conveying motive fluid to said power reverse gear, means controlled by said latch-operating lever for opening and closing the passage through said duct accordingly as said latch is in a released position or in a latching position respectively, and means cooperatively associated with said main governing lever for controlling said latch operating lever actuating means.

3. In combination with a power reverse gear of a locomotive, said gear including a cylinder having a valve chest to which motive fluid is conducted from a reservoir, a piston in the cylinder, a piston rod, a connecting rod from the piston rod to a lever on a rocker shaft of a locomotive valve gear, an engineer's governing lever for controlling the action of said piston, a latch carried by said governing lever and a fixed quadrant cooperating with said latch to hold said governing lever in any of several positions of adjustment; mechanism for locking said rocker shaft against movement, said mechanism comprising a quadrant carried by said rocker shaft, a latch cooperating with said quadrant, means continuously tending to hold said last named latch in engagement with said quadrant, fluid operated means acting against said last named means to cause it to release said latch from said quadrant, a control valve for said fluid operated means, means on said governing lever for actuating said control valve to supply motive fluid to said fluid operated means, and means for shutting off the flow of motive fluid to said valve chest while said latch is engaged, said continuously tending holding means including a movable part mounted to operate said flow-shutting-off means to cause it to permit the motive fluid to flow to said valve chest during the time that said latch is in the released position.

4. In combination with a power reverse gear of a locomotive said gear including a cylinder having a valve chest to which motive fluid is conducted from a reservoir, a piston in the cylinder, a piston rod, a connecting rod from the piston rod to a lever on a rocker shaft of a locomotive valve gear, an engineer's governing lever for controlling the action of said piston, a latch carried by said governing lever and a fixed quadrant cooperating with said latch to hold said governing lever in any of several positions of adjustment; mechanism for locking said rocker shaft against movement, said mechanism comprising a quadrant carried by said rocker shaft, a latch cooperating with said quadrant, means continuously tending to hold said last-named latch engaged with said quadrant, fluid operated means acting against said last-named means to cause it to release said latch from said quadrant, a control valve for said fluid operated means, means on said governing lever for actuating said control valve to supply motive fluid to said fluid operated means and means for shutting off the flow of motive fluid to said valve chest while said latch is engaged, said continuously tending holding means comprising a lever, a lever cooperating with a piston and a cylinder and a spring in the cylinder tending to move the piston in one direction, said piston being movable in the opposite direction by the actuating fluid when said control valve is opened said lever being arranged to cooperate with said "means for shutting off the flow" when said lever is moved by the actuating fluid.

5. In combination with a power reverse gear of a locomotive, said gear including a cylinder having a valve chest to which motive fluid is conducted from a reservoir, a piston in the cylinder, a piston rod, a connecting rod from the piston rod to a lever on a rocker shaft of a locomotive valve gear, an engineer's governing lever for controlling the action of said piston, a latch carried by said governing lever and a fixed quadrant cooperating with said latch to hold said governing lever in any of several positions of adjustment; mechanism for locking said rocker shaft against movement, said mechanism comprising a quadrant carried by said rocker shaft, a latch cooperating with said quadrant, spring means continuously tending to hold said last-named latch engaged with said quadrant, fluid operated means acting in opposition to said spring means to cause it to effect the release of said latch from said quadrant, a control valve for said fluid operated means, means on said governing lever for actuating said control valve to supply motive fluid to said fluid operated means, means for shutting off the flow motive fluid to said valve chest while said latch is engaged, said spring means comprising a lever, a lever cooperating with a piston and cylinder and a spring in the cylinder tending to move the piston in one direction, said piston being movable in the opposite direction by the actuating fluid when said control valve is opened and means to bleed the actuating fluid from said actuating cylinder when said control valve is closed, said lever acting to open said shut-off means when the latch is disengaged.

6. In combination with a power reverse gear which includes a cylinder having a valve chest for controlling the flow of operating fluid to the cylinder, a piston operating in the cylinder, a piston rod and a connection between said rod and a rocker shaft of the locomotive driving gear; a reverse cylinder cutoff valve located in a duct between the main reservoir and said reverse gear valve chest and located in proximity to said rocker shaft, a lock for said rocker shaft, spring actuated means for holding said lock locked, said spring actuated means including an element adjacent which said cut-off valve is cooperatively located, fluid pressure means acting against said spring actuated means to unlock said lock and then cause said element to open said cutoff valve, means under control of the engineer for actuating said fluid pressure means, and other means under control of the engineer for setting the valve in said valve chest.

7. In combination with a power lever gear which includes a cylinder having a valve chest for controlling the flow of operating fluid to the cylinder, a piston operating in the cylinder, a piston rod and a connection between said rod and a rocker shaft of the locomotive driving cylinder valve gear; a reverse cylinder cutoff valve located in a duct between the main reservoir and said reverse gear valve chest and located in proximity to said rocker shaft, a lock for said rocker shaft, spring and lever actuated means for holding said lock locked, said cut-off valve being located adjacent and in cooperative relation to said lever, fluid pressure means acting against said spring and lever actuated means to unlock said lock and then open said cutoff valve, means under control of the engineer for actuating said fluid pressure means, and other means under control of the engineer for setting the valve in said valve chest.

8. In combination with a power reverse gear which includes a cylinder having a valve chest, a piston operating in the cylinder, a piston rod and a connection between said rod and a rocker shaft of the locomotive driving cylinder valve gear, a cut-off valve in a duct between a power reservoir and said reverse gear valve chest, mechanical means operative alternately to lock said rocker shaft and to actuate said cut-off valve so as to admit fluid to the valve chest of said power reverse cylinder and means under the control of the engineer for actuating said first-mentioned means.

9. In combination with a power reverse gear of a locomotive, said gear including a cylinder having a valve chest to which motive fluid is conducted from a reservoir, a piston in the cylinder, a piston rod, a connecting rod from the piston rod to a lever on a rocker shaft of a locomotive valve gear, an engineer's governing lever for controlling the action of said piston, a latch carried by said governing lever and a fixed quadrant cooperating with said latch to hold said governing lever in any of several positions of adjustment; mechanism for locking said rocker shaft against movement, said mechanism comprising a quadrant carried by said rocker shaft, a latch cooperating with said quadrant, a spring actuated means to hold said last-named latch engaged with said quadrant, fluid operated means acting in opposition to said spring actuated means to cause it to effect the release of said latch from said quadrant, a control valve for said fluid-operated means, means on said governing lever for actuating said control valve to supply motive fluid to said fluid operated means, a cut-off valve for shutting off the flow of motive fluid to said valve chest while said latch is engaged, said spring actuated means comprising a latch operating and cut-off valve operating lever, a lever operating piston and cylinder, the spring in the cylinder tending to move the piston in one direction, said piston being movable in the opposite direction by the actuating fluid when said control valve is opened, and means to bleed the actuated fluid from said actuating cylinder when said control valve is closed.

10. In combination with a power reverse gear which includes a cylinder having a valve chest, a piston operating in the cylinder, a piston rod and a connection between said rod and a rocker shaft of a locomotive driving cylinder valve gear; a cut-off valve in a duct between a power reservoir and said reverse gear valve chest, means operative alternately to lock said rocker shaft and to actuate said cut-off valve so as to admit fluid to the valve chest above said power reverse cylinder, and means under the control of the engineer for actuating said first-mentioned means, said locking means serving to move said cut-off valve to its open position.

LESHER B. RITTENHOUSE.